(12) United States Patent
Fujii et al.

(10) Patent No.: US 7,806,792 B2
(45) Date of Patent: Oct. 5, 2010

(54) AUXILIARY BICYCLE SHIFTING COMPONENT

(75) Inventors: Nobuyoshi Fujii, Sakai (JP); Hideki Ikemoto, Sakai (JP)

(73) Assignee: Shimano Inc., Osaka (JP)

( * ) Notice: Subject to any disclaimer, the term of this patent is extended or adjusted under 35 U.S.C. 154(b) by 511 days.

(21) Appl. No.: 11/524,327

(22) Filed: Sep. 21, 2006

(65) Prior Publication Data

US 2007/0197324 A1 Aug. 23, 2007

(30) Foreign Application Priority Data

Feb. 21, 2006 (JP) ............................... 2006-043537

(51) Int. Cl.
*F16H 9/00* (2006.01)
*F16H 59/00* (2006.01)
*F16H 61/00* (2006.01)
*F16H 63/00* (2006.01)

(52) U.S. Cl. .......................................... 474/80; 474/82

(58) Field of Classification Search .................. 474/80, 474/82, 144
See application file for complete search history.

(56) References Cited

U.S. PATENT DOCUMENTS

| | | | |
|---|---|---|---|
| 4,734,083 A | 3/1988 | Nagano | |
| 4,961,720 A | 10/1990 | Juy | |
| 5,584,106 A * | 12/1996 | Anscher | 24/625 |
| 6,612,952 B1 * | 9/2003 | Simpson et al. | 474/111 |
| 6,641,494 B1 | 11/2003 | Campagnolo | |
| 6,641,495 B2 * | 11/2003 | Valle | 474/80 |
| 2003/0228947 A1 * | 12/2003 | Valle | 474/80 |

FOREIGN PATENT DOCUMENTS

| | | |
|---|---|---|
| DE | 37 12 156 A1 | 10/1987 |
| EP | 0 086 691 A1 | 8/1983 |
| EP | 0 348 315 A1 | 12/1989 |
| FR | 2 287 376 | 5/1976 |
| FR | 2 518 042 | 6/1983 |
| FR | 2 870 508 | 11/2005 |

* cited by examiner

*Primary Examiner*—John Q Nguyen
*Assistant Examiner*—Henry Liu
(74) *Attorney, Agent, or Firm*—Global IP Counselors, LLP (57) ABSTRACT

A front derailleur is provided with an auxiliary bicycle shifting component to minimize reduction in downshifting performance when a chain is located on a chain-entry side of a chain guide. The auxiliary bicycle shifting component basically has a fixed part and a chain contact part. The fixed part is used to fix the chain contact part on the chain guide. The chain contact part is disposed on the chain-entry side of an outer plate of a chain guide of the front derailleur, and is configured and arranged to contact with a chain.

9 Claims, 9 Drawing Sheets

AUXILIARY BICYCLE SHIFTING COMPONENT

CROSS-REFERENCE TO RELATED APPLICATIONS

This application claims priority under 35 U.S.C. §119 to Japanese Patent Application No. 2006-043537, filed on Feb. 21, 2006. The entire disclosure of Japanese Patent Application No. 2006-043537 is hereby incorporated herein by reference.

BACKGROUND OF THE INVENTION

1. Field of the Invention

This invention generally relates to a bicycle front derailleur. More specifically, the present invention relates to an auxiliary bicycle shifting component that can be mounted on a chain guide of a front derailleur.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle drive train.

Bicycles, and particularly sport type bicycles, use chain driven types of drive trains with a front transmission device including a front derailleur and front chain wheel with two or three sprockets, and a rear transmission device including a rear derailleur and multi-stage gears with seven to ten sprockets. The front derailleur of this type of shifting device basically includes a base member, a chain guide and a movement mechanism. The base member is secured to the frame of the bicycle with the chain guide be movable in relation to the base member by the movement mechanism. The chain guide has an inner plate, and an outer plate that is disposed at an interval from the inner plate. The chain guide moves to selectively contact the chain with one of the inner and outer plates. In particular, the chain runs through the space between the inner plate and the outer plate, and the chain guide is moved towards and away from the frame to guide the chain to the desired sprocket. Conventionally known examples of such front derailleurs include those in which the part of the inner side surface of the outer plate of the chain guide on the chain-entry side is depressed farther in than the other portions to allow for smoother downshifting, and to ensure that the chain does not come into contact with the outer plate of the chain guide while the gears are not being shifted (see, for example, U.S. Pat. No. 6,641,494).

If the chain-entry side of the outer plate of the chain guide is depressed farther in than other portions, then the chain will not come into contact with the outer plate while the gears are not being shifted. However, in the case of a rear-suspension bicycle, referred to as a full-suspension bike, the chain is sometimes located on the depressed portion of the chain-entry side when the rear suspension is extended; i.e., when the distal end of the rear frame swings downward in relation to the front frame. When at attempt is made to downshift the gears in this state, sometimes the outer plate cannot efficiently apply pressure to downshift the chain, and the downshifting capability is reduced.

In view of the above, it will be apparent to those skilled in the art from this disclosure that there exists a need for an improved auxiliary bicycle shifting component. This invention addresses this need in the art as well as other needs, which will become apparent to those skilled in the art from this disclosure.

SUMMARY OF THE INVENTION

One object of the present invention is to provide an auxiliary bicycle shifting component that prevent downshifting from becoming impeded when the chain is located on the chain-entry side of the chain guide of a front derailleur.

The foregoing objects can basically be attained by providing an auxiliary bicycle shifting component that basically comprises a fixed part and chain contact part in accordance with a first aspect of the present invention. The fixed part is configured and dimensioned to be secured to a chain guide of a front derailleur. The chain contact part extending from the fixed part so as to be disposed on a chain-entry side of an outer plate of the chain guide of the front derailleur to selectively contact a chain passing through the chain guide of the front derailleur, when the fixed part is secured to the chain guide of the front derailleur. When the fixed part of the shifting guide is fixed to the chain guide of the front derailleur, the chain contact part is disposed on the chain-entry side of the outer plate, and the thickness of the chain-entry side of the outer plate is increased. Therefore, the chain can be pushed in the downshifting direction when the chain is disposed on the chain-entry side when the gears are downshifted. Since the shifting auxiliary component is provided with a chain contact part that is disposed on the chain-entry side of the outer plate, the thickness of the chain-entry side of the outer plate is increased. Therefore, the chain can be pushed in the downshifting direction when the chain is disposed on the chain-entry side and the gears are downshifted, making it unlikely that the downshifting performance will be adversely affected.

According to a second aspect of the present invention, the auxiliary bicycle shifting component of the first aspect of the present invention is provided such that the chain contact part is configured and dimensioned to be disposed on an inside surface of the outer plate that faces an inner plate of the chain guide, when the fixed part is secured to the chain guide of the front derailleur. In this case, the chain is pushed even more easily because the chain contact part can be disposed on the inside surface of the outer plate.

According to a third aspect of the present invention, the auxiliary bicycle shifting component of the first or second aspect of the present invention is provided such that the fixed part includes a pair of parallel opposing parts configured and dimensioned for sandwiching a connecting part of the chain guide that connects the inner plate with the outer plate on the chain-entry side; and the fixed part further includes a locking member engaged with distal ends of the opposing parts to lock the opposing parts on the connecting part of the chain guide of the front derailleur, when the fixed part is secured to the chain guide of the front derailleur. In this case, the shifting auxiliary component is easily mounted because the shifting auxiliary component can be fixedly locked on the chain guide merely by locking the distal ends of the opposing parts with the locking member, in a state in which the connecting part on the chain-entry sides of the inner plate and the outer plate are sandwiched by the pair of the opposing parts. Also, downshifting is not likely to be affected because the shifting auxiliary component is fixed by the connecting part on the chain-entry side.

According to a fourth aspect of the present invention, the auxiliary bicycle shifting component of the first or second aspect of the present invention is provided such that the fixed part includes a pair of parallel opposing parts configured and dimensioned for sandwiching the outer plate on the chain-entry side; and the fixed part further includes a locking member engaged with distal ends of the opposing parts to lock the opposing parts on the outer plate of the chain guide of the front derailleur, when the fixed part is secured to the chain guide of the front derailleur. In this case, the configuration of the auxiliary bicycle shifting component can be simplified because the shifting auxiliary component is directly mounted on the outer plate.

According to a fifth aspect of the present invention, the auxiliary bicycle shifting component of the third or fourth aspect of the present invention is provided such that each of the distal ends of the opposing parts includes an interlocking protuberances for engaging with the locking member. In this case, the locking member can be reliably engaged by the interlocking member.

According to a sixth aspect of the present invention, the auxiliary bicycle shifting component of any one of the first to fifth aspects of the present invention is provided such that the contact part and the fixed part are formed of a synthetic resin with the contact part being integrally formed as a one-piece member of part of the fixed part. This reduces the likelihood of scraping noises being produced by the chain sliding against the chain contact part when the chain comes into contact with the chain contact part.

According to a seventh aspect of the present invention, a derailleur is provided that basically comprises a base member, a chain guide, a moving mechanism and an auxiliary bicycle shifting component. The base member is configured and arranged to be fixedly attached to bicycle. The chain guide is configured to move between a retracted position and an extended position relative to the base member. The chain guide includes an inner plate and an outer plate defining a chain receiving slot to guide a chain. The moving mechanism is coupled between the base member and the chain guide to move the chain guide between the retracted position and the extended position. The auxiliary bicycle shifting component includes a fixed part releasably secured to the chain guide and a chain contact part extending from the fixed part so as to be disposed on a chain-entry side of the outer plate of the chain guide to selectively contact the chain passing through the chain guide of the front derailleur. This front derailleur can yield the same operational effects according to any one of the first to sixth aspects of the present invention because the thickness of the chain-entry side of the outer plate of the chain guide can be increased due to the shifting auxiliary component.

According to the present invention, the thickness of the chain-entry side of the outer plate is increased because the shifting auxiliary component is provided with a chain contact part that is disposed on the chain-entry side of the outer plate. Therefore, the chain can be pushed in the downshifting direction when the chain is disposed on the chain-entry side during downshifting, and downshifting performance is not likely to be reduced.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
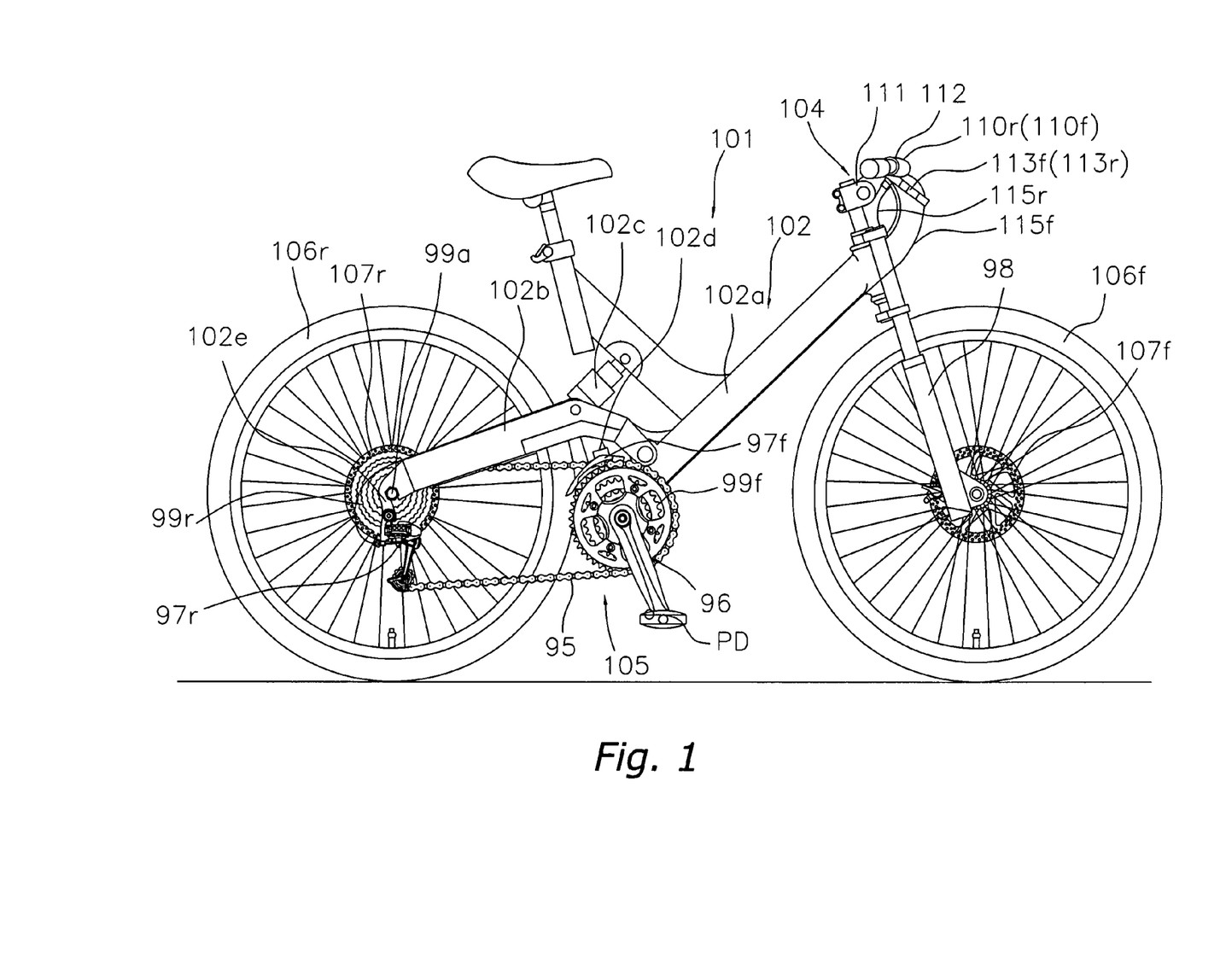
FIG. 1 is a side elevational view of a bicycle equipped with a front derailleur in accordance with a first embodiment of the present invention.

Referring initially to FIG. 1, a bicycle 101 is illustrated that is equipped with a first embodiment of the present invention. The bicycle 101 is a full-suspension bike, that basically comprises a frame 102, a handlebar unit 104, a drive unit 105, a front wheel 106, a rear wheel 107 and front and rear disc brake devices 108 (the rear disc brake device is not shown). The frame 102 basically comprises a front frame 102a and a rear frame 102b. A front double-crown suspension fork 98 is provided on the front frame 102a. The rear frame 102b is swingably mounted on the front frame 102a. A rear suspension unit 102c is mounted between the front frame 102a and the rear frame 102b. The handlebar unit 104 is fastened to the suspension fork 98. In particular, the handle unit 104 includes a handle stem 111, and a handlebar 112 that is fitted into and secured in the top end of the handle stem 111. The handle stem 111 is fitted in and secured at the top of the front fork 98.

The drive unit 105 basically comprises a chain 95, a pair of a crank 96, a pair of pedals PD, front and rear derailleurs 97f and 97r, and front and rear sprocket sets 99f and 99r, and other conventional components. The front and rear wheels 106 and 107 are mounted to the suspension fork 98 and the swing arm 100, respectively, as seen in FIG. 1. The front and rear wheels 106 and 107 are each provided with a plurality of spokes 99. The bicycle 101 is also provided with front and rear braking devices 107f and 107r for applying braking forces to, and shifting control units 110f and 110r for shifting the front and rear derailleurs 97f and 97r.

The handlebar 112 has a pair of left and right brake levers 113f and 113r mounted thereto. The shifting control units 110f and 110r are provided either integrally with or separate from the inner sides of these brake levers 113f and 113r. The shifting control units 110f and 110r are connected to the front and rear derailleurs 97f and 97r via a pair of shifting cables 115f and 115r, respectively.

As described above, the drive unit 105 includes the chain 95, the front and rear derailleurs 97f and 97r for moving the chain 95 from one sprocket to another, and the front and rear sprocket sets 99f and 99r. The front derailleur 97f is mounted on a derailleur mounting tube 102d that extends upward at an incline from a hanger part (not shown) provided to the rear bottom of the front frame 102a, and the position of the front derailleur is switched back and forth between two shifting positions by the shifting control unit 110f to guide the chain 95. The rear derailleur 97r is mounted on a rear pawl 102e at the rear of the rear frame 102b, and the position of the rear derailleur is switched among ten shifting positions by the shifting control unit 110r to guide the chain 95.

The front sprocket set 99f has three sprockets F1 through F3 that have different numbers of teeth and that are aligned in the axial direction of the crank shaft. The rear sprocket set 99r has ten sprockets that have different numbers of teeth and that are aligned in the axial direction along a rear wheel hub axle 106a. In the front sprocket set 99f, the innermost sprocket F1 has the fewest number of teeth, and the sprockets F2 and F3 on the outer side thereof have progressively greater numbers of teeth. In the rear sprocket set 99r, the sprockets have progressively fewer numbers of teeth from the innermost sprocket outward, and the outermost top sprocket as the fewest number of teeth. The front and rear derailleurs 97f and 97r perform the shifting operation by moving the chain 95 among these sprockets. The shifting operation is performed by the shifting control units 110f and 110r, which use the brake levers 113f and 113r.

Figure 2:
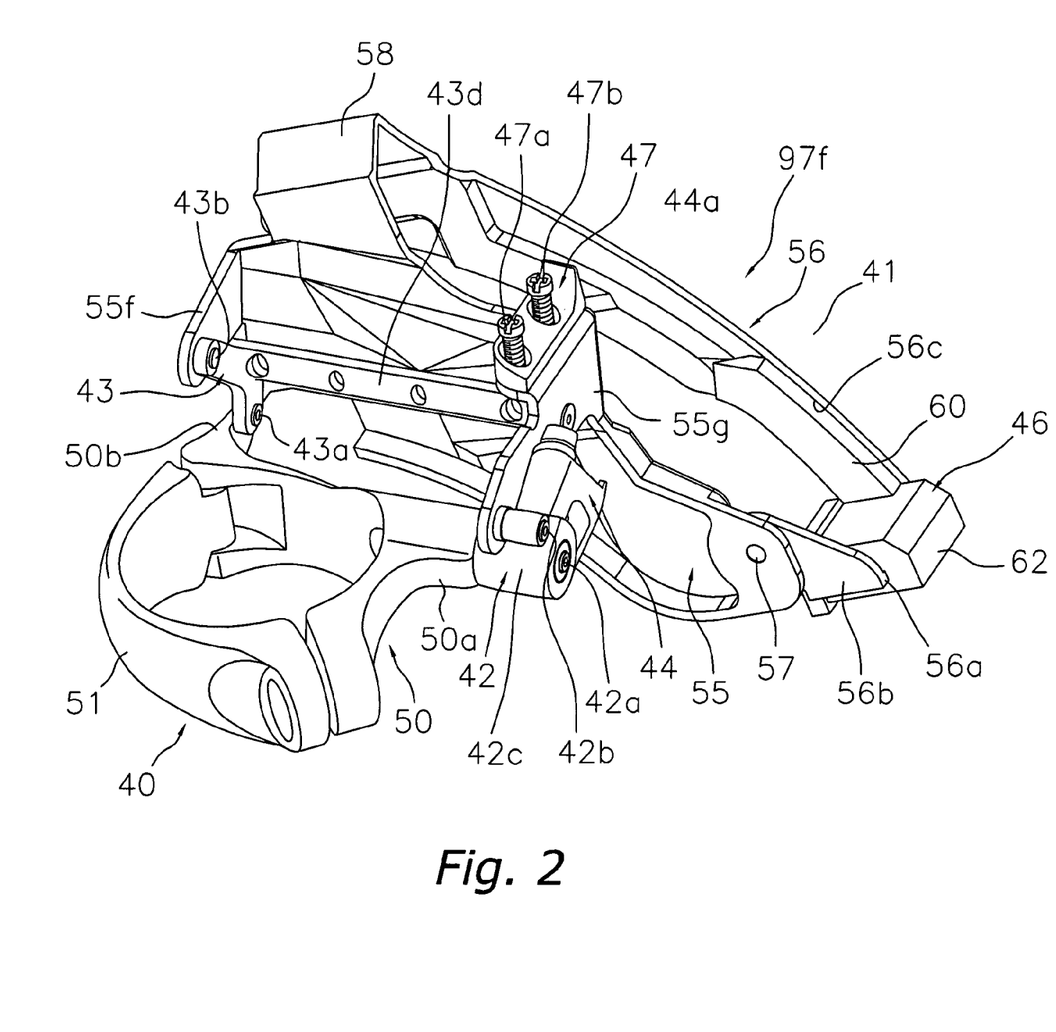
FIG. 2 is an inside perspective view of the front derailleur illustrated in FIG. 1 in accordance with the first embodiment of the present invention.
Figure 3:
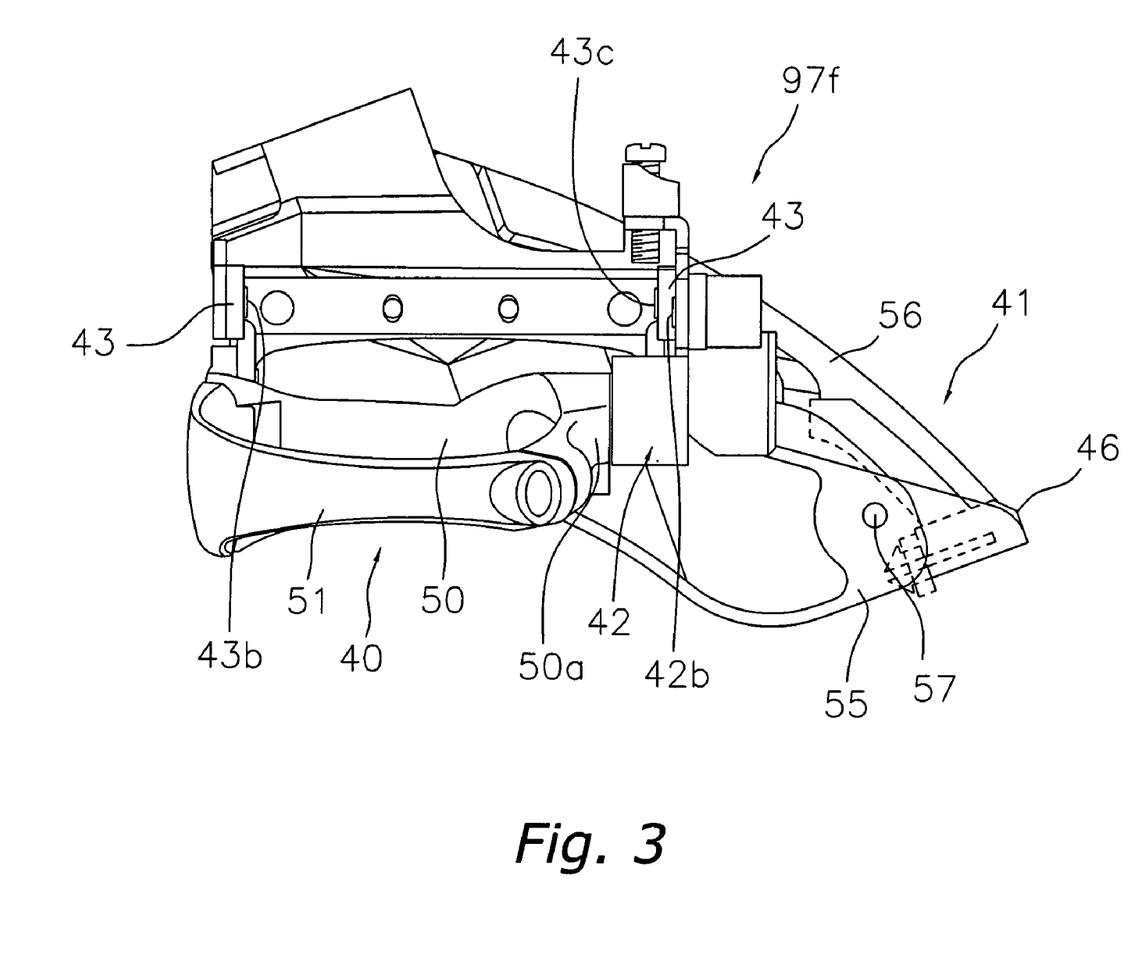
FIG. 3 is an inside elevational side view of the front derailleur illustrated in FIGS. 1 and 2 in accordance with the first embodiment of the present invention.
Figure 4:
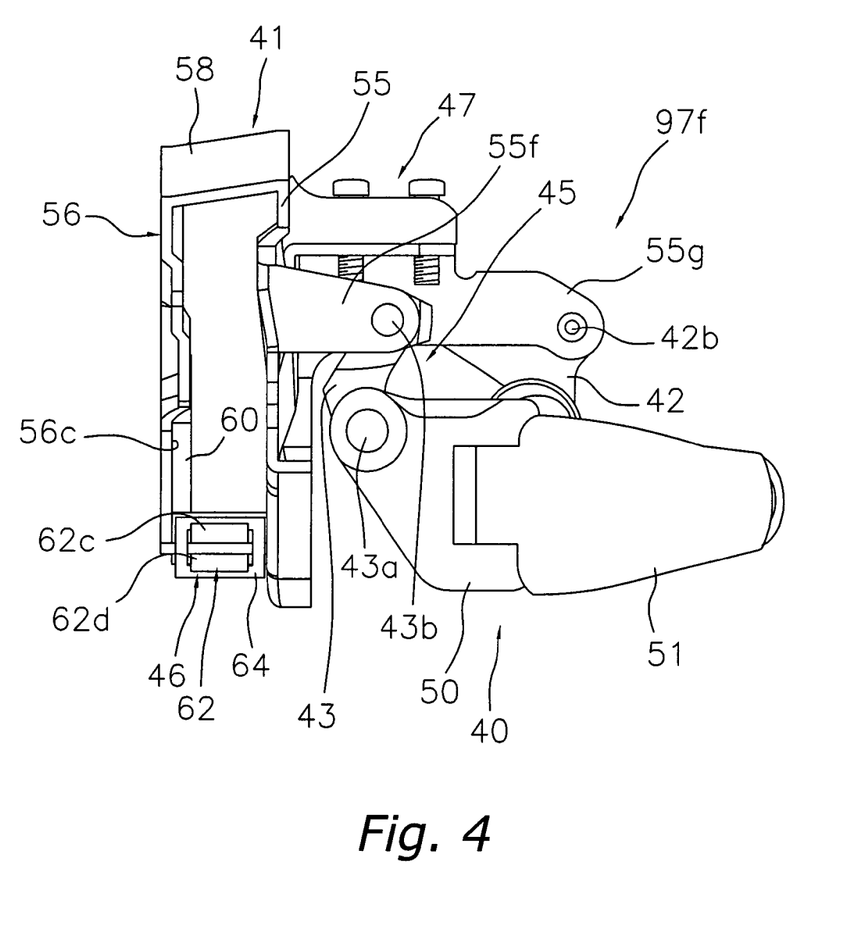
FIG. 4 is a rear elevational side view of the front derailleur illustrated in FIGS. 1 to 3 in accordance with the first embodiment of the present invention.

The front derailleur 97f has a base member 40, a chain guide 41 and a movement mechanism 45. The base member 40 is secured to the front frame 102a in conventional manner. The chain guide 41 moves in the shifting directions by moving nearer to and away from the base member 40. The movement mechanism 45 pivotally connects the base member 40 with the chain guide 41 such that the chain guide 41 is moved relative to the base member 40, as shown in FIGS. 2 through 4. The front derailleur 97f also has a shifting auxiliary component 46 that is mounted to the chain guide 41. The movement mechanism 45 has an inner link 42 and an outer link 43 with the inner and outer links 42 and 43 being disposed parallel to each other.

The base member 40 has a first base bracket 50, and a second base bracket 51. The second base bracket 51 is pivotally mounted on the first base bracket 50. The first and second base brackets and 50 and 51 encloses the derailleur mounting tube 102d. The first base bracket 50 is provided with an inner link support 50a on which the inner link 42 is mounted while allowed to swing upward about a link axle 42a. A torsion coil spring (not shown) as an urging member for urging the chain guide 41 into lower gear positions is disposed on the outer peripheral side of the link axle 42a. The torsion coil spring is engaged with the first base bracket 50 at one end and with the inner link 42 at the other end, and is covered by a cylindrical cover 42c formed in an integral fashion on the inner link 42. Two outer link supports 50b are provided to protrude from the outer side of the inner link support 50a. Also two outer links 43 are swingably on mounted these outer link supports via link axles (only one is shown in the diagrams) 43a.

The chain guide 41 moves among three shifting positions, including a low position opposite the small sprocket F1 disposed on the inside, a middle position opposite the medium sprocket F2 disposed in the middle, and a top position opposite the large sprocket F3 disposed on the outside. The chain guide 41 guides the chain 95 among these three sprockets F1, F2, and F3. The chain guide 41 is swingably linked to the top ends of the inner link 42 and the outer links 43. The chain guide 41 has an inner plate 55 and an outer plate 56. The outer plate 56 is disposed on the outer side of the inner plate 55 at an interval from the inner plate 55 to define a chain guide slot. The chain 95 can be guided between the inner plate 55 and the outer plate 56.

The inner plate 55 and the outer plate 56 are formed in the present embodiment by cutting a thin metal plate into a specific shape by pressing, and then bending the plate. Therefore, in the present embodiment, the plates 55 and 56 are formed in an integral fashion, and are connected at one location at the back end side (the right side in FIG. 2, or the chain-entry side) by a connecting bolt 57. These plates are also connected integrally, while bent into a C shape at a top connecting part 58.

Two link connecting parts 55f and 55g are provided to the inner plate 55. The link connecting parts 55f and 55g bend towards the frame side of the inner plate 55. The link connecting part 55f is shorter than the link connecting part 55g in terms of bending length. The top end of one of the outer links 43 is swingably connected to the link connecting part 55f via a link axle 43b. The top end of the other outer link 43 is swingably connected to the link connecting part 55g via a link axle 43c. The top end of the inner link 42 is swingably connected to the inner side thereof via a link axle 42b. An adjusting mechanism 47 is provided on the top surface of the link connecting part 55g. The adjusting mechanism 47 has two screws 47a and 47b for adjusting the top and low positions of the chain guide 41.

Figure 7:
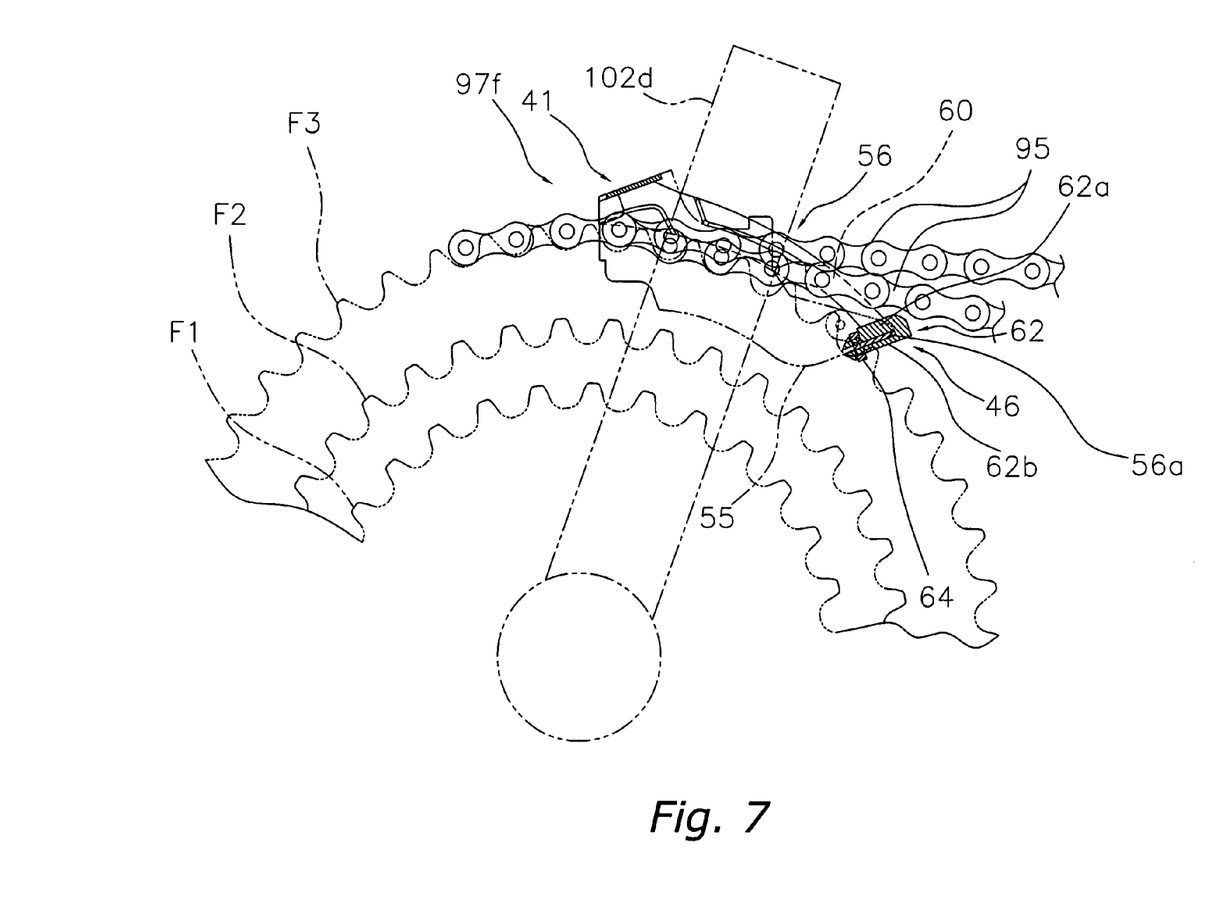
FIG. 7 is a schematic diagram for describing the downshifting operation using the front derailleur with the shifting auxiliary component in accordance with the first embodiment of the present invention.

The inner plate 55 is formed into the shape of an arc that extends from the back end to the front end (the side where the chain exits) along the outer peripheries of the sprockets F1 through F3. The shape allows the inner plate to intersect with the chain 95, as shown in FIGS. 2 through 4. The inner plate 55 is also formed to be stronger than the outer plate 56 by being provided with an uneven surface and a press-formed edge. This is because the inner plate 55 is used to derail the chain 95 from the sprocket F1 during upshifting, which requires that strong force be applied from the low position towards the top position. The lower part of the inner plate 55 is disposed farther in radially than the teeth tips of the sprocket F3, as shown in FIG. 7, when the inner plate is disposed at the top position on the outside.

The outer plate 56 is formed into the shape of an arc so as to be disposed farther out radially than the inner plate 55. When the outer plate 56 is disposed at the outside top position shown in FIG. 7, a gap of about 1 mm to 3 mm is formed between the bottom part and the teeth tips of the sprocket F3. Therefore, the front derailleur 97f is set onto the derailleur mounting tube 102d so that this gap is formed. The rear part of the outer plate 56 is bent into a C shape. Specifically, in the chain-entry side at the rear of the front derailleur 97f, the outer plate 56 is bent to form a rear connecting part 56a and a screw clamp part 56b. The rear connecting part 56a is bent towards the inner plate 55 and connected with the inner plate 55. The screw clamp part 56b is bent even farther from the rear connecting part 56a and disposed on the inside surface at the rear of the inner plate 55. This screw clamp part 56b is connected and secured in place to the inner plate 55 by the connecting bolt 57. Also, a receding concavity 56c, which is recessed farther in than the front of the chain-exit side, is formed at the rear of the outer plate 56. The purpose of this receding concavity 56c is to prevent the chain 95 from coming into contact with the outer plate 56 and making scraping noises when the chain 95 is disposed at an incline due to being meshed with the small sprocket F1 and the outside sprocket of the rear sprocket set 99r.

The inner link 42 is disposed above the base member 40 so that the base member 40 is mounted on the derailleur mounting tube 102d. The inner link 42 is pivotally connected at both ends to the first base bracket 50 and the chain guide 41, as shown in FIGS. 2 through 4. The inner link 42 is swingably connected at one end to the inside of the inner link support 50a. The chain guide 41 is swingably connected to the other end of the inner link 42. A cable interlocking arm 44 is formed in an integral fashion on the link supporting portion of the inner link 42. The cable interlocking arm 44 extends away from this portion towards the chain guide 41. A cable interlocking part 44a is provided at the extended distal end of the cable interlocking arm 44 for securing an inner cable of a shifting cable with a bolt.

The outer links 43 are connected by a connecting portion 43d. The outer links 43 are pivotally connected at both ends to the chain guide 41 and to a pair of outer link supports 50b of the base member 40 at positions separated from the base member 40 by the inner link 42. The outer links 43 are disposed parallel to the inner link 42.

Figure 5:
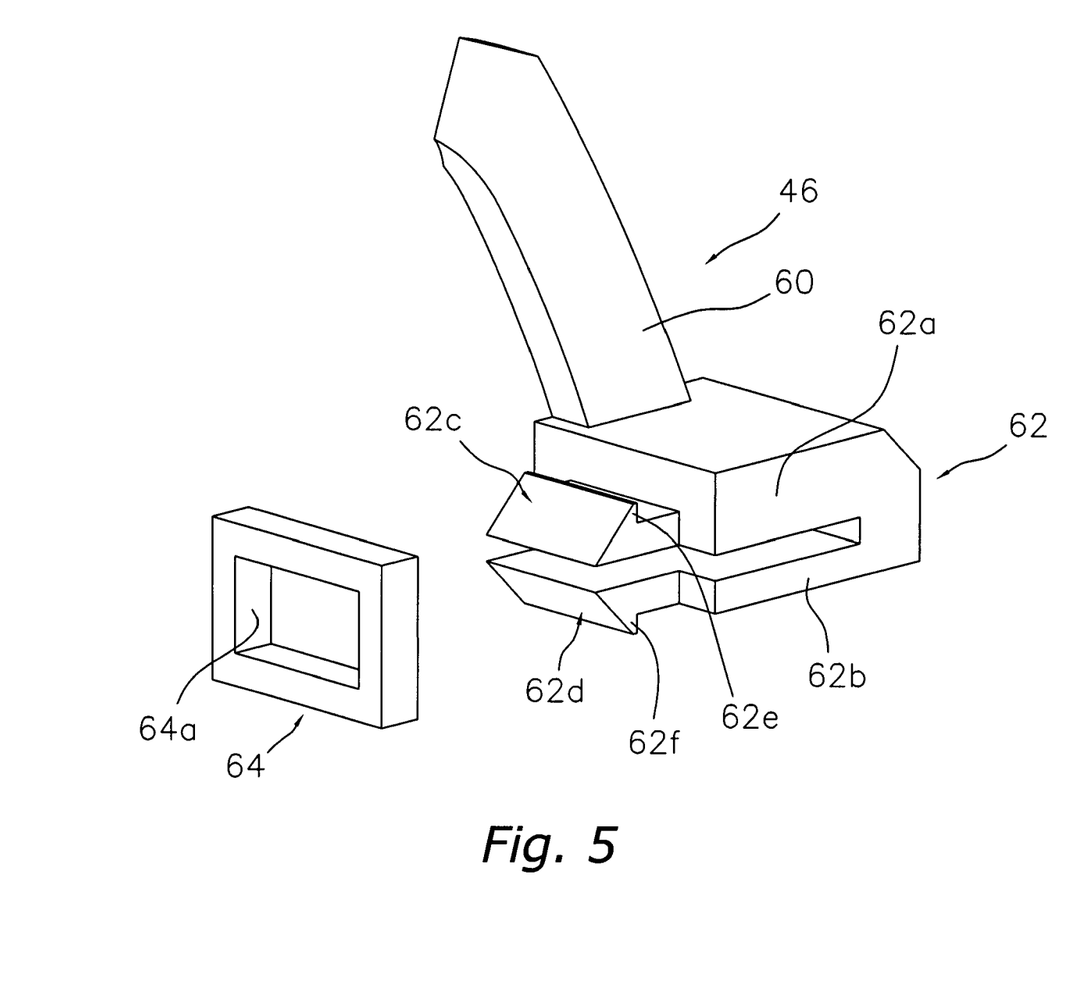
FIG. 5 is a perspective view of the shifting auxiliary component used with the front derailleur illustrated in FIGS. 1 to 3 in accordance with the first embodiment of the present invention.
Figure 6:
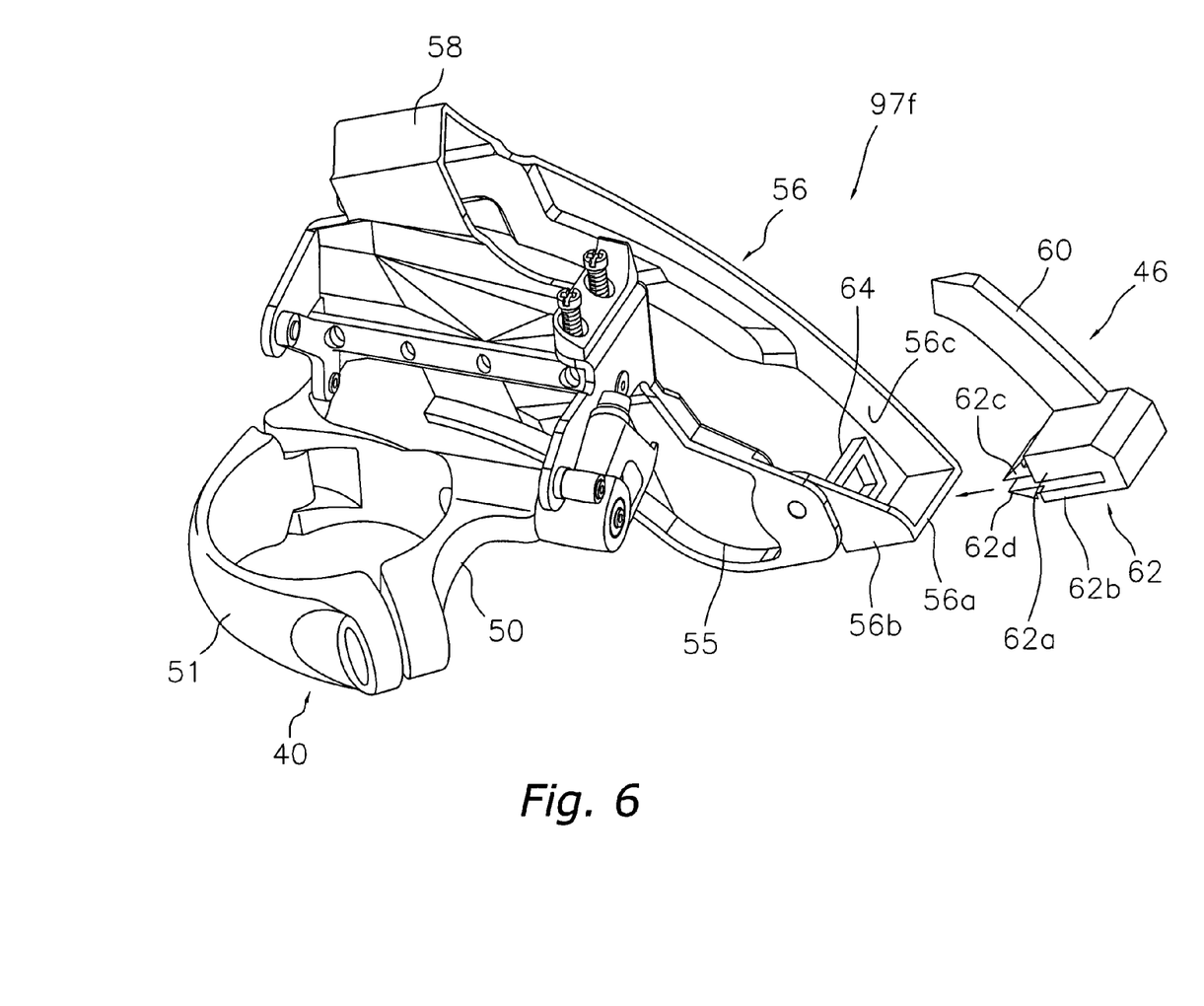
FIG. 6 is an exploded perspective view of the front derailleur and the shifting auxiliary component in accordance with the first embodiment of the present invention that depicts the procedure for mounting the shifting auxiliary component to the front derailleur.

The shifting auxiliary component 46 can be rear-mounted to the front derailleur 97f. The shifting auxiliary component 46 is made of a polyacetal resin, a polyimide resin, or another synthetic resin that is elastic and hard, and has low friction. The shifting auxiliary component 46 basically comprises a chain contact part 60 and a fixed part 62. The chain contact part 60 is curved into a bow shape along the top and bottom of the outer plate 56, as shown in FIGS. 5 and 6. The chain contact part 60 is disposed at the rear (chain-entry side) of the outer plate 56 of the chain guide 41. The chain contact part 60 is configured and dimensioned to contact with the chain 95. The fixed part 62 is configured and dimensioned for fixing the chain contact part 60 onto the chain guide 41. The fixed part 62 includes a locking member 64 that is configured and dimensioned for locking the shifting auxiliary component 46 onto the chain guide 41.

The chain contact part 60 can be disposed on the inside surface of the outer plate 56 that faces the inner plate 55 of the chain guide 41, i.e., at the position where the receding concavity 56c is formed at the rear of the inside surface of the outer plate 56. The thickness of the chain contact part 60 is preferably designed so that the chain contact part 60 is in the same plane as the portion on which the receding concavity 56c is not formed, but it is also acceptable for the chain contact part 60 to be in a different plane than the concavity if there is a slight step.

The fixed part 62 has a pair of opposing parts 62a and 62b disposed parallel to each other. The opposing parts 62a and 62b are capable of sandwiching the rear connecting part 56a. The proximal ends of the opposing parts 62a and 62b are connected and are formed into a C shape that has a groove through the entire length. Interlocking protuberances 62c and 62d that engage with the locking member 64 are formed at the distal ends of the opposing parts 62a and 62b and protrude from the opposing parts 62a and 62b. Catches 62e and 62f are formed at the ends of these protuberances and protrude away from the protuberances.

The locking member 64 is made of an elastic synthetic resin, and is formed into a rectangular ring shape having a rectangular opening 64a. The locking member 64 extends past the catches 62e and 62f and is mounted on the interlocking protuberances 62c and 62d, thereby locking the opposing parts 62a and 62b that sandwich the rear connecting part 56a.

When the shifting auxiliary component 46 is mounted on the chain guide 41, the groove formed between the opposing parts 62a and 62b of the fixed part 62 is mounted on the rear connecting part 56a from the back, and the rear connecting part 56a is sandwiched by the pair of opposing parts 62a and 62b, as shown in FIG. 6. In this state, the chain contact part 60 is disposed so as to cover the receding concavity 56c of the outer plate 56. The result is that at least part of the receding concavity 56c is covered and the concavity is no longer exposed. Lastly, the locking member 64 is inserted between the interlocking protuberances 62c and 62d from the front of the rear connecting part 56a, the fixed part 62 is locked, and the shifting auxiliary component 46 is secured in place on the chain guide 41. Thus, the shifting auxiliary component 46 can be back-mounted to a known front derailleur, whereupon the receding concavity 56c on the inside surface of the outer plate 56 can be covered.

When the gears are downshifted from the top position to the middle position, or from the middle position to the low position, in the front derailleur 97f thus configured, the chain 95 comes into contact with the outer plate 56 of the chain guide 41, is derailed from the sprocket F3 or the sprocket F2, and is guided onto the sprocket F2 or the sprocket F1. The regular switching operation of the chain 95 at this time is shown by the thin lines in FIG. 7. During this downshifting operation, the rear suspension unit 102c extends past the uneven part, and the rear frame 102b swings counterclockwise in FIG. 1 relative to the front frame 102a, at which point the chain 95 moves towards the receding concavity 56c as shown by the solid lines in FIG. 7. If the shifting auxiliary component 46 has not been mounted and there is no chain contact part 60, then the inside surface of the outer plate 56 cannot efficiently apply pressure to the chain 95.

However, if the shifting auxiliary component 46 is mounted using the procedure described above, then the receding concavity 56c is covered and the outer plate 56 is increased in thickness on the chain-entry side. The result is that the chain 95 can be pushed in the downshifting direction even if the chain 95 is disposed on the chain-entry side when the gears are being downshifted. Therefore, if the chain 95 is disposed on the chain-entry side of the outer plate 56 when the gears are downshifted, the chain 95 can still be pushed in the downshifting direction, and downshifting performance is not likely to be reduced.

Moreover, since all the parts are formed in an integral fashion from a synthetic resin, it is unlikely that scraping noises will be produced by the chain 95 sliding against the chain contact part 60 if the chain 95 comes into contact with the chain contact part 60 after shifting.

In the previous embodiment, the inner plate and the outer plate were formed in an integral fashion, but the present invention is not limited thereto, and the inner plate and outer plate may also be formed separately.

Second Embodiment

Figure 8:
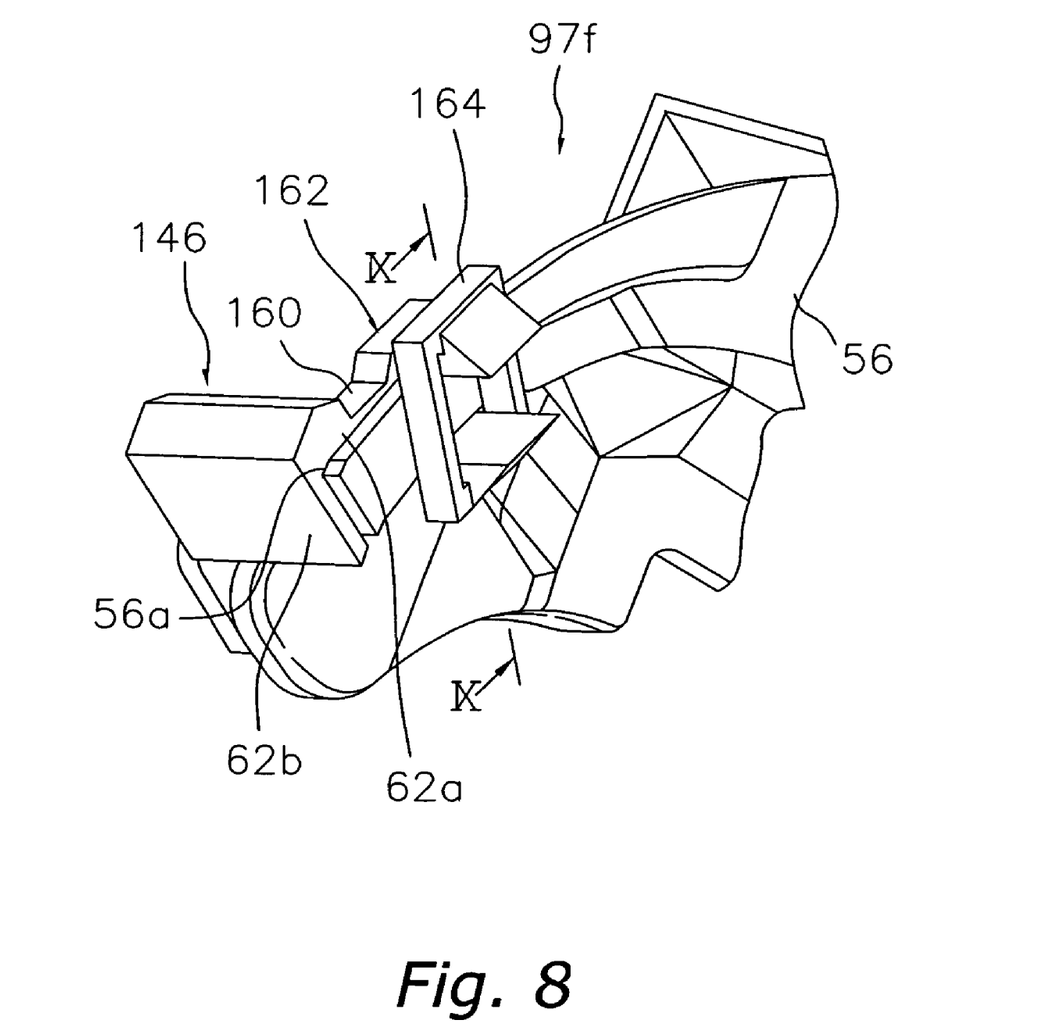
FIG. 8 is a partial perspective view of the front derailleur illustrated in FIGS. 1 to 3 with an auxiliary shifting component in accordance with a second embodiment of the present invention.
Figure 9:
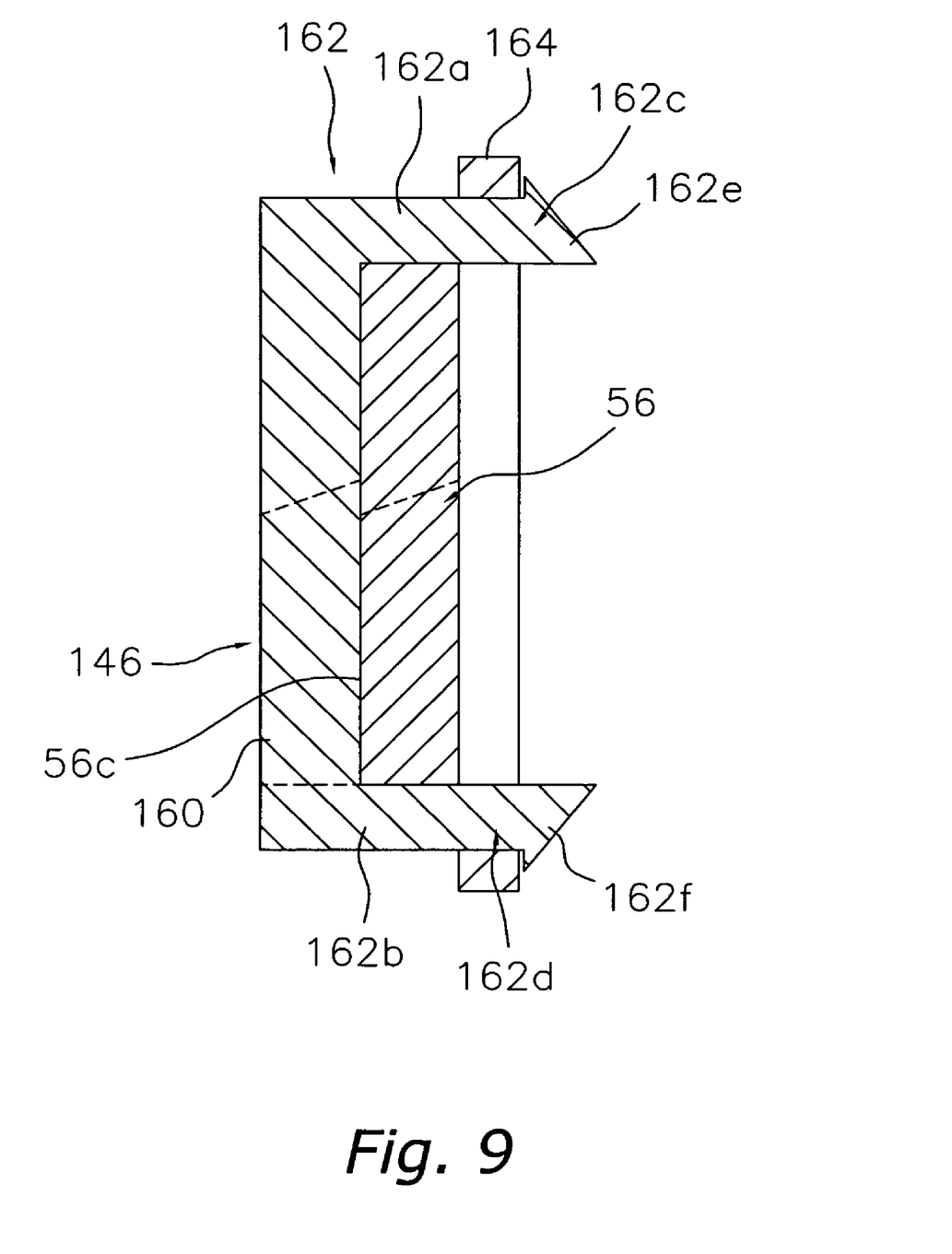
FIG. 9 is a cross-sectional view of the front derailleur and the auxiliary shifting component as seen along section line IX-IX in FIG. 8.

Referring now to FIGS. 8 and 9, an shifting auxiliary component 146 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the previous embodiment, the fixed part was mounted on the rear connecting part 56a, but the mounted position of the fixed part is not limited to the rear connecting part. In FIGS. 8 and 9, the shifting auxiliary component 146 includes a chain contact part 160 and a fixed part 162. The chain contact part 160 of the shifting auxiliary component 146 has the same shape as in the previous embodiment. The fixed part 162 has opposing parts 62a and 62b similar to those of the fixed part 62 at one end of a chain contact part 160, but the opposing parts 62a and 62b are not locked. The fixed part 162 further has opposing parts 162a and 162b that can sandwich the outer plate 56 from the chain contact part 160 from their inner sides. Interlocking protuberances 162c and 162d that engage with a locking member 164 are formed at the distal ends of the opposing parts 162a and 162b to protrude from the opposing parts 162a and 162b. Catches 162e and 162f that protrude away from the protuberances are formed at the protruding ends of the protuberances.

When the shifting auxiliary component 146 with this configuration is mounted on the outer plate 56, the chain contact part 160 bends inward, and the opposing parts 62a and 62b are mounted on the rear connecting part 56a so that the interlocking protuberances 162c and 162d do not interfere with the outer plate 56. In this state, the chain contact part 160 is disposed so as to cover the receding concavity 56c of the outer plate 56. The result is that at least part of the receding concavity 56c is covered and the concavity is no longer exposed. The locking member is then inserted between the interlocking protuberances 162c and 162d in a state in which the top and bottom halves of the outer plate 56 are sandwiched by the opposing parts 162a and 162b, and the fixed part 162 is locked to fix the shifting auxiliary component 146 in place on the chain guide 41. The same operational effects as those of the previous embodiment are obtained in this case as well.

In the previous embodiments, the present invention was described using as an example a three-speed front derailleur for a full-suspension bike having rear suspension, but the present invention can also be applied to a front derailleur having two sprockets for two-speed shifting, such as is found in a road racer. The present invention can also be applied to an electrical derailleur.

In the previous embodiments, the chain contact part and the fixed part were formed in an integral fashion, but they may also be configured separately. For example, the chain contact part may be made of a synthetic resin, while the fixed part is made of a metal. The reverse is also acceptable. In this case, the parts may be formed in an integral fashion by insertion molding or another means, or they may be fixed together by bonding or another fixing means.

In the previous embodiments, the configuration was designed with the fixed part inserted into the chain guide so that the shifting auxiliary component could be back-mounted to the front derailleur, but the method of fixing the fixed part is not limited to that of the previous embodiment, and bonding, threaded engagement, caulking, or another suitable fixation means can also be used.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An auxiliary bicycle shifting component for attachment to a chain guide of a derailleur, the auxiliary bicycle shifting component comprising:

a fixed part having a pair of parallel opposing parts and a chain contacting part, the parallel opposing parts being configured and dimensioned to removably extend around opposing sides of a connecting portion of the chain guide that connects an inner plate with an outer plate on the chain-entry side of the chain guide, the opposing parts sandwiching the connecting portion of the chain guide therebetween, the chain contact part extending from the fixed part so as to be disposed on an inside surface of the chain guide at a chain-entry side of the chain guide of the derailleur to selectively contact the bicycle chain passing through the chain guide of the derailleur, when the fixed part is secured to the connecting portion of the chain guide of the derailleur; and a locking member dimensioned and configured for removable engagement with distal ends of the opposing parts to lock the chain contact part in position around the connecting portion of the chain guide when the fixed part is secured to the portion of the chain guide of the derailleur, the locking member and the fixed part being removable from the chain guide and one another.

2. The auxiliary bicycle shifting component according to claim 1, wherein each of the distal ends of the opposing parts includes an interlocking protuberances for engaging with the locking member.

3. The auxiliary bicycle shifting component according to claim 1, wherein the contact part and the fixed part are formed of a synthetic resin with the contact part being integrally formed as a one-piece member with part of the fixed part.

4. A bicycle front derailleur comprising:

a base member configured and arranged to be fixedly attached to bicycle;

a chain guide configured to move between a retracted position and an extended position relative to the base member, the chain guide including an inner plate, an outer plate fixed to one another shaped and dimensioned to encircle a bicycle chain defining a chain receiving slot to guide the bicycle chain;

a moving mechanism coupled between the base member and the chain guide to move the chain guide between the retracted position and the extended position; and an auxiliary bicycle shifting component removably coupled to the chain guide, the auxiliary bicycle shifting component including a fixed part and a locking member, the fixed part being releasably secured to the chain guide, the fixed part having a chain contact part extending from the fixed part so as to be disposed on an inside surface and chain-entry side of the outer plate of the chain guide facing the inner plate of the chain guide to selectively contact the bicycle chain passing through the chain guide of the front derailleur, the fixed part including a pair of opposing parts with distal ends, the opposing parts sandwiching a connecting portion of the chain guide that connects the inner plate with the outer plate on the chain-entry side, and the locking member being engaged with the distal ends of the opposing parts to lock the opposing parts on the portion of the chain guide when the fixed part is secured to the chain guide of the front derailleur, the fixed part and the locking member being removably attachable to the chain guide and one another.

5. The bicycle front derailleur according to claim 4, wherein
the contact part and the fixed part are formed of a synthetic resin with the contact part being integrally formed as a one-piece member with part of the fixed part.

6. The bicycle front derailleur according to claim 4, wherein
each of the distal ends of the opposing parts includes an interlocking protuberances for engaging with the locking member.

7. The bicycle front derailleur according to claim 4, wherein
the contact part and the fixed part are formed of a synthetic resin with the contact part being integrally formed as a one-piece member with part of the fixed part.

8. A bicycle front derailleur comprising:
a base member configured and arranged to be fixedly attached to bicycle;

a chain guide configured to move between a retracted position and an extended position relative to the base member, the chain guide including an inner plate and an outer plate defining a chain receiving slot to guide a chain;

a moving mechanism coupled between the base member and the chain guide to move the chain guide between the retracted position and the extended position; and an auxiliary bicycle shifting component removably coupled to the chain guide, the auxiliary bicycle shifting component including a fixed part releasably secured to the chain guide and a chain contact part extending from the fixed part so as to be disposed on a chain-entry side of the outer plate of the chain guide to selectively contact the chain passing through the chain guide of the front derailleur, the fixed part including a pair of parallel opposing parts configured and dimensioned for sandwiching a connecting part of the chain guide that connects the inner plate with the outer plate on the chain-entry side; and the fixed part further including a locking member removably engaged with distal ends of the opposing parts to lock the opposing parts on the connecting part of the chain guide of the front derailleur.

9. The bicycle front derailleur according to claim 8, wherein
each of the distal ends of the opposing parts includes an interlocking protuberances for engaging with the locking member.

* * * * *